United States Patent
Sakamoto et al.

(10) Patent No.: US 6,933,451 B2
(45) Date of Patent: Aug. 23, 2005

(54) SEATED PASSENGER'S WEIGHT DETECTION DEVICE

(75) Inventors: Kazunori Sakamoto, Chiryu (JP); Genta Moriyama, Anjo (JP); Kentaro Morishita, Okazaki (JP); Yasunori Hasegawa, Kasugai (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 219 days.

(21) Appl. No.: 10/401,692

(22) Filed: Mar. 31, 2003

(65) Prior Publication Data

US 2004/0011570 A1 Jan. 22, 2004

(30) Foreign Application Priority Data

Mar. 29, 2002 (JP) ......................................... 2002-096813

(51) Int. Cl.$^7$ .............................................. B60R 21/32
(52) U.S. Cl. ...................... 177/144; 180/273; 280/735
(58) Field of Search ......................... 177/144; 180/273; 280/735

(56) References Cited

U.S. PATENT DOCUMENTS

| | | | | |
|---|---|---|---|---|
| 5,466,001 A | * | 11/1995 | Gotomyo et al. | 280/730.1 |
| 5,670,853 A | * | 9/1997 | Bauer | 318/286 |
| 6,042,145 A | * | 3/2000 | Mitschelen et al. | 280/735 |
| 6,356,200 B1 | * | 3/2002 | Hamada et al. | 340/667 |

FOREIGN PATENT DOCUMENTS

| | | |
|---|---|---|
| DE | 198 52 541 C | 3/2000 |
| DE | 100 36 479 A | 3/2001 |
| GB | 2 363 202 A | 8/2001 |
| JP | 11-304579 A | 11/1999 |

* cited by examiner

Primary Examiner—Randy W. Gibson
(74) Attorney, Agent, or Firm—Burns, Doane, Swecker & Mathis, L.L.P.

(57) ABSTRACT

A seated passenger's weight detection device includes a seat vertical position adjusting means having a front link and a rear link, a weight detection sensor for detecting a weight of a seated passenger on the basis of an input from the front link and an input from the rear link and a backward and forward input cancel means for canceling backward and forward inputs which operate to the front link and the rear link.

12 Claims, 7 Drawing Sheets

SEATED PASSENGER'S WEIGHT DETECTION DEVICE

FIELD OF THE INVENTION

The present invention relates to a seated passenger's weight detection device, and particularly relates to a seated passenger's weight detection device which is applied to a seat slidably disposed in the vertical direction on a floor of a vehicle of an automobile and so on.

BACKGROUND OF THE INVENTION

Figure 6:
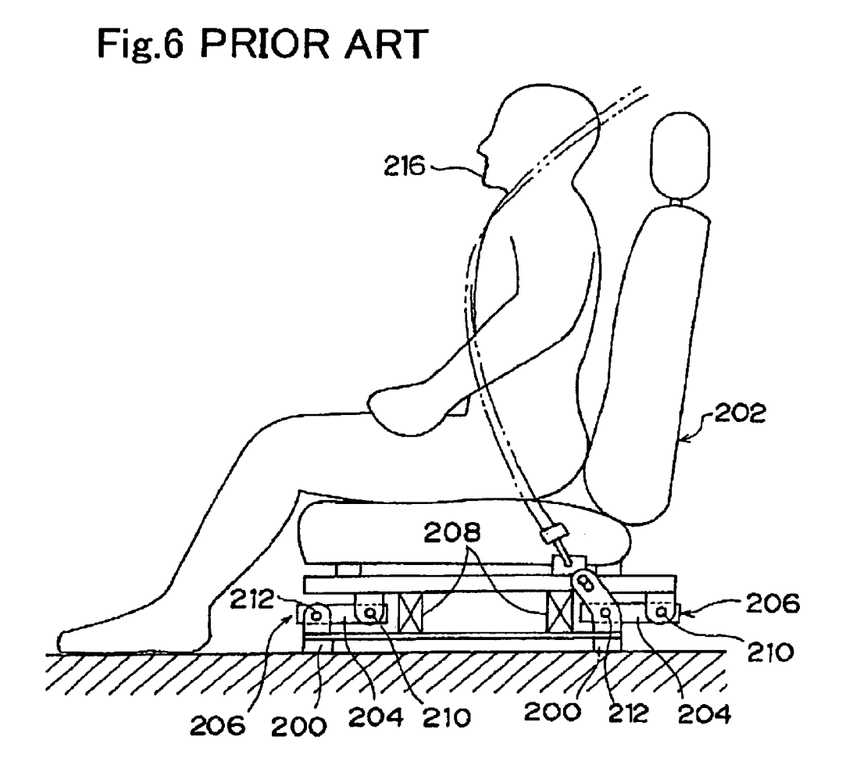
FIG. 6 is a general side view illustrating a seat to which a prior seated passenger's weight detection device is applied.

Heretofore, a type of a seated passenger's weight detection device which is applied to a seat slidably disposed in the vertical direction on a floor of a vehicle of an automobile and so on is disclosed in Japanese Patent Laid-Open Publication No. 11-304579. As shown in FIG. 6, this seated passenger's weight detection device is provided with a seat connecting mechanism 206 which connects between a seat bracket 200 of the vehicle and a seat 202 and which includes an arm 204 being rotatable upward and downward and a load sensor 208 between the seat 202 and the vehicle. Further, the arm 204 is pivoted on a rotation fulcrum 210 of seat side and a rotation fulcrum 212 of vehicle body side and the load sensor 208 receives selectively a vertical direction component of a weight of the seat operated to the arm 204.

Figure 7:
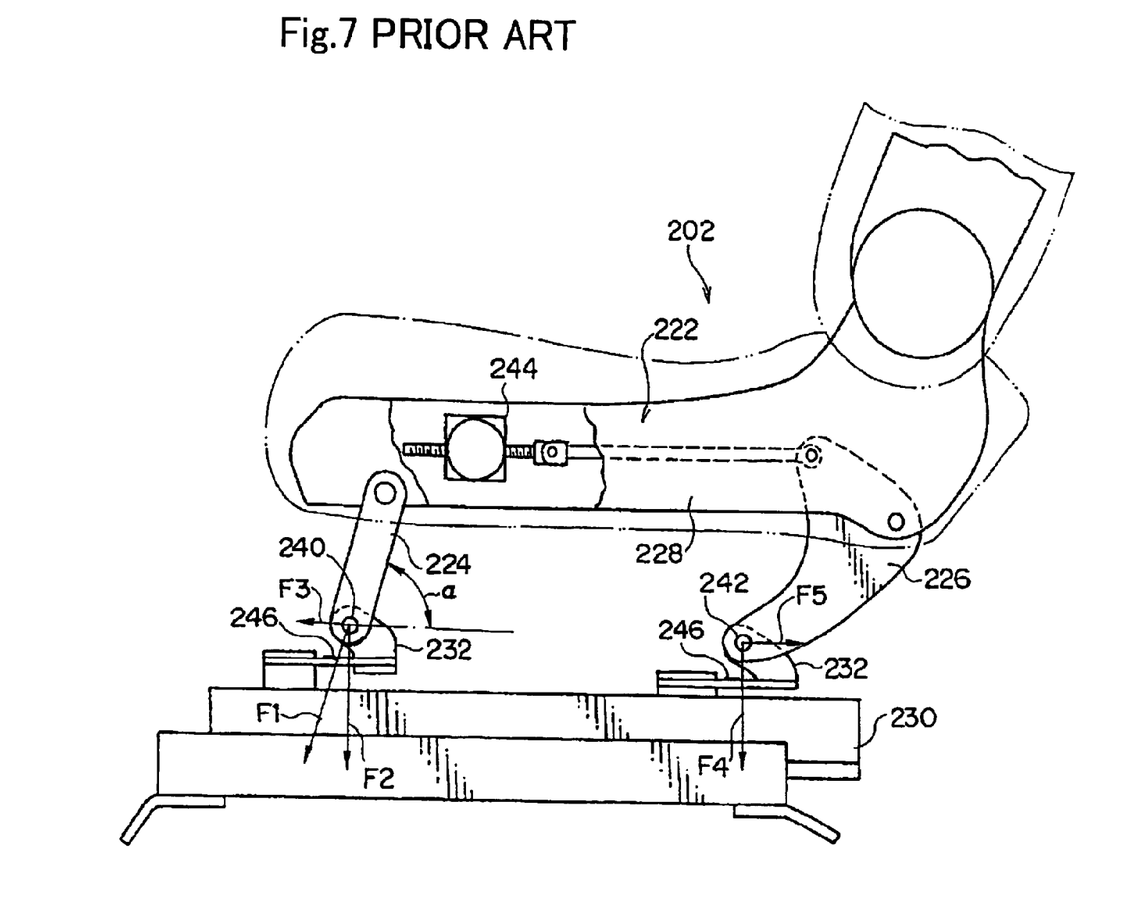
FIG. 7 is a general side view illustrating a part of a seat to which a prior seated passenger's weight detection device is applied.

In this seated passenger's weight detection device, however, as shown in FIG. 7, in case that a seat vertical position adjusting means 222 being able to adjust a position in the vertical direction is disposed on the seat 202, a seat cushion flame 228 and sensor brackets 232 fixed on an upper slide rail 230 are connected by a front link 224 and a rear link 226 constituting the seat vertical position adjusting means 222 and axis 240, 242.

Hereby, a downward component force F2 and a forward component force F3 of an input F1 from the front link 224 operate to the sensor bracket 232 of front side through the axis 240 by an angle α of inclination of the front link 224. Thereby, a downward input F4 from the rear link 226 connected to an actuator 244 of the seat vertical position adjusting means 222 and a reaction force F5 of the component force F3 operate to the sensor bracket 232 of rear side through the axis 242. Namely, extra forward force F3 or extra backward force F5 other than the downward forces F2, F4 being required for strain sensors 246 as the load sensors disposed on the sensor brackets 232 operates to the sensor brackets 232. These forces F3 and F5 are applied as tension and compression forces directly to the sensor brackets 232 on which the strain sensors 246 are fixed. Therefore, the forces F3 and F5 make the stain sensors 246 generate unnecessary strain and there is in danger that the measurement accuracy of the load operated to the seat decreases.

SUMMARY OF THE INVENTION

In view of the above fact, it is an object of the present invention to obtain a seated passenger's weight detection device which can improve a measurement accuracy of the load operated to a seat.

A seated passenger's weight detection device according to the present invention comprises a seat vertical position adjusting means having a front link and a rear link, a weight detection sensor for detecting a weight of a seated passenger on the basis of an input from the front link and an input from the rear link and a backward and forward input cancel means for canceling backward and forward inputs which operate to the front link and the rear link.

DESCRIPTION OF THE PREFERRED EMBODIMENT

Hereinafter, a first embodiment of a seated passenger's weight detection device of the present invention will be described with referent to FIG. 1 and FIG. 2. In the Figures, an arrow FR shows a forward of a vehicle, an arrow UP shows an upward of the vehicle and an arrow IN shows an inside direction in the width of the vehicle.

Figure 1:
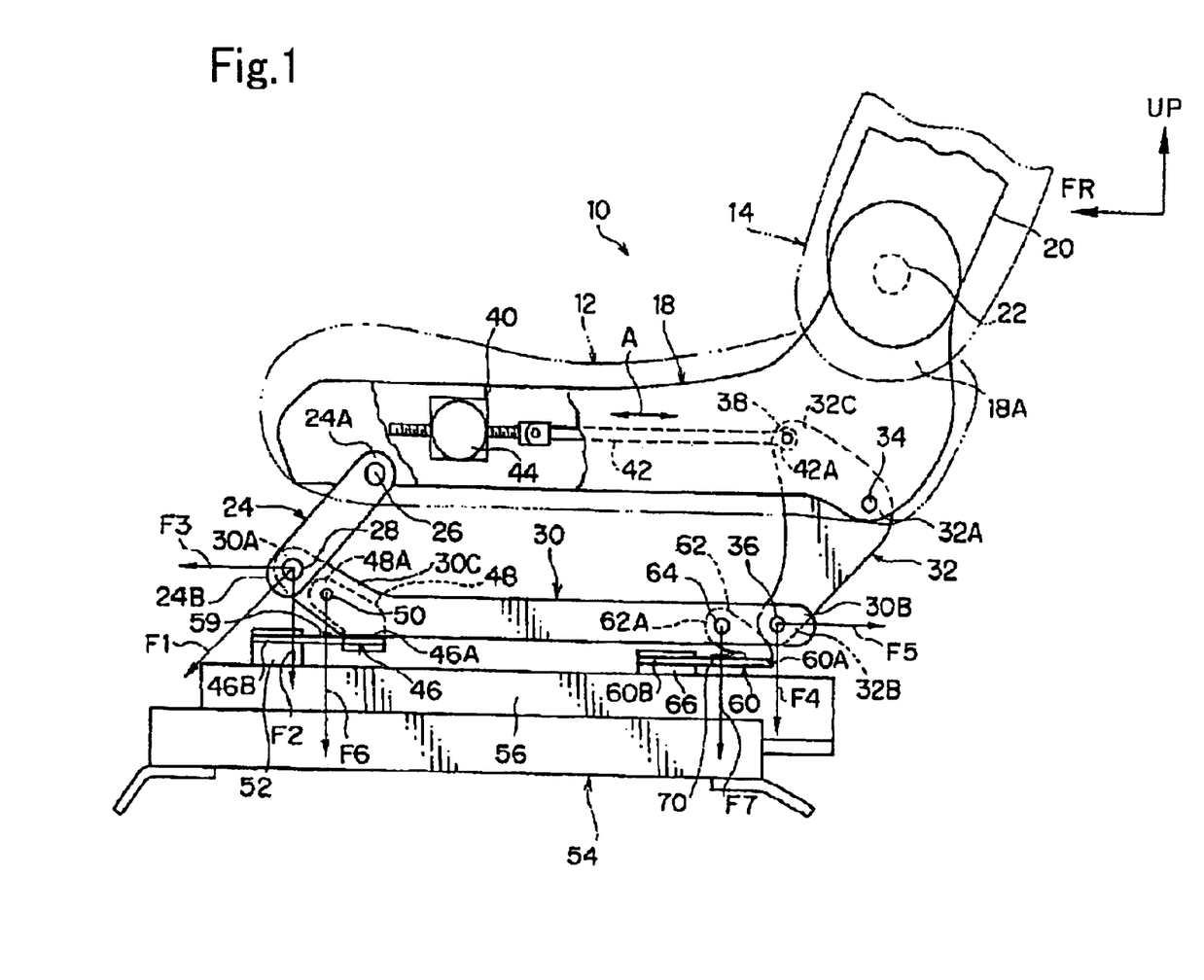
FIG. 1 is a general side view illustrating a part of a seat to which a seated passenger's weight detection device according to a first embodiment of the present invention is applied.
Figure 2:
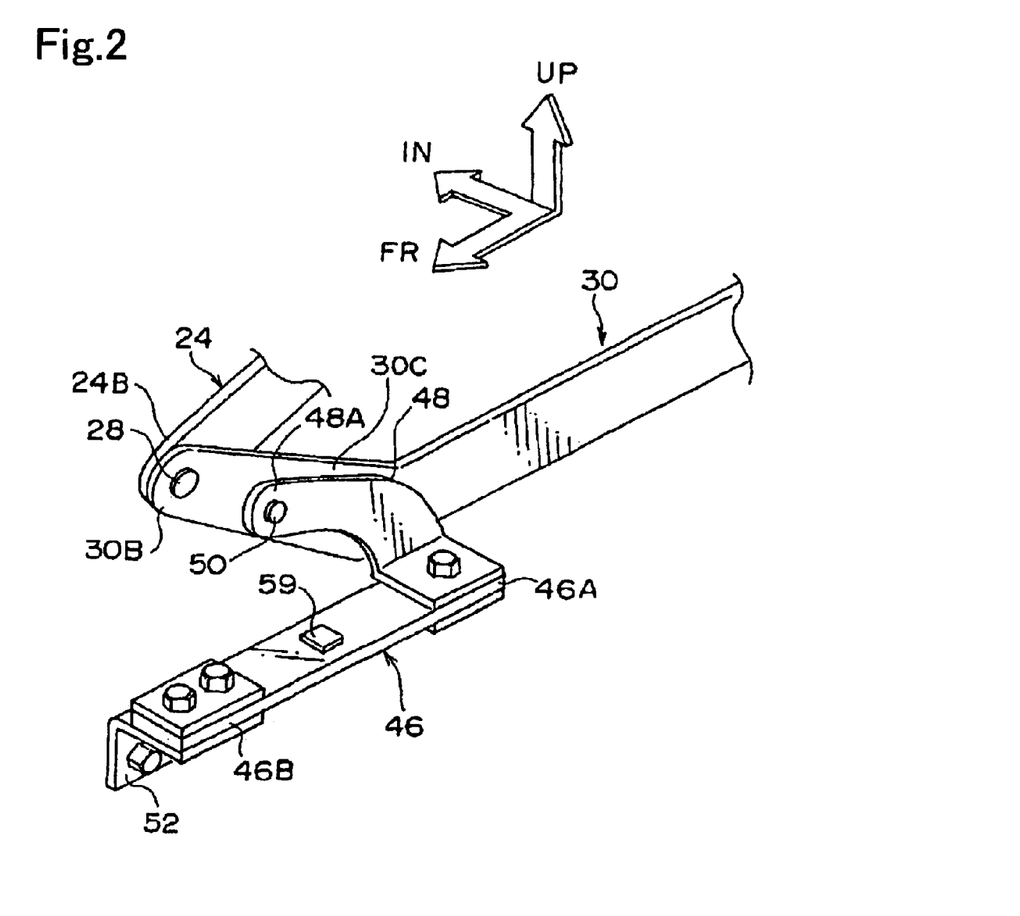
FIG. 2 is a perspective view illustrating a front sensor bracket of a seated passenger's weight detection device according to a first embodiment of the present invention.

As shown in FIG. 1, on a rear portion of a seat cushion 12 of a vehicular seat 10 of the embodiment, a seatback 14 is mounted thereon so as to be able to rotate backward and forward. Further, on rear ends 18A of a pair of lower arms (also called as seat cushion flame) 18 in right and left, axis 22 are provided and a seatback flame 20 on which a seat back pad, a headrest and so on are mounted is mounted rotatably backward and forward around the axis 22. A well known reclining mechanism (not shown) is disposed on a connecting portion between the lower arm 18 and the seat back flame 20 and the angle of gradient of the seatback flame 20 relative 10 the lower arm 18 can be adjusted.

On a vicinity of a front end of the lower arm 18, an upper end portion 24A of a front link 24 constituting a seat vertical position adjusting means is rotatably connected thereon by an axis 26 and a lower end portion 24B of the front link 24 is rotatably connected to a front end portion 30A of a connecting link 30 of a connecting member as a backward and forward input cancel means by an axis 28.

On the other hand, a rear end comer portion 32A of a rear link 32 having a triangle shape in side view constituting the seat vertical position adjusting means is rotatably connected to a vicinity of a rear end portion of the lower arm 18 by an axis 34 and a lower end corner portion 32B of the rear link 32 is rotatably connected to a rear end portion 30B of the connecting link 30 by an axis 36. Further, an upper end comer portion 32C of the rear link 32 is rotatably connected to a rear end portion 42A of a rod 42 of an actuator 40 constituting the seat vertical position adjusting means by an axis 38. The actuator 40 is fixed to the lower arm 18 and has a well known structure in which the rod 42 moves backward and forward by a rotation of a motor 44. Accordingly, when the rod 42 moves backward and forward (a direction shown by an arrow A in FIG. 1), the rear link 32 rotates around the axis 36 and the front link 24 rotates around the axis 28, and the lower arm 18 moves in the vertical direction.

The connecting link 30 is disposed approximately horizontally and a taper portion 30C which inclines upward and forward is formed on the vicinity of the front end portion 30A. As shown in FIG. 2, a top end portion 48A of a mounting flange 48 provided on a rear end portion 46A of a front sensor bracket 46 is rotatably connected to the taper portion 30C of the connecting link 30 by an axis 50. Further, a front end portion 46B of the front sensor bracket 46 is fixed to a upper rail 56 of a seat rail 54 through a bracket 52 (see FIG. 1). A strain sensor 59 as a weight detecting sensor is disposed on a upper surface side of a center portion backward and forward of the front sensor bracket 48.

As shown in FIG. 1, a top end portion 62A of a mounting flange 62 provided on a rear end portion 60A of a rear sensor bracket 60 is rotatably connected to the vicinity of the rear end portion 30B of the connecting link 30 by an axis 64 and the rear sensor bracket 60 has the almost same shape as the front sensor bracket 46. Further, a front end portion 60B of the rear sensor bracket 60 is fixed to the upper rail 56 of the seat rail 54 through a bracket 66 and a strain sensor 70 as a weight detecting sensor is disposed on a upper surface side of a center portion backward and forward of the rear sensor bracket 60.

Next, the operation of the embodiment will be described. In this embodiment, when a passenger is seated on the seat cushion 12 of the seat 10, load are applied to the strain sensor 59 on the front sensor bracket 46 and the strain sensor 70 on the rear sensor bracket 60 through the front link 24 and the rear link 32. In this time, the front link 24 and the rear link 32 have a predetermined inclined angle in response to the vertical position of the seat cushion 12. Thereby, a downward component force F2 and a forward component force F3 of an input F1 from the front link 24 operate to the axis 28 connecting between the front ink 24 and the connecting link 30. On the other hand, a downward input F4 from the rear link 32 and a reaction force F5 of the component force F3 operate to the axis 36 connecting between the connecting link 30 and the rear link 32 connected to the actuator 40. Namely, extra forward force F3 or extra backward force F5 other than the downward forces F2, F4 being required for the strain sensors 59, 70 is applied to the axis 28 and the axis 36.

In this embodiment, however, the axis 28 of the front link 24 and the axis 36 of the rear link 32 are connected each other by the connecting link 30. The front sensor bracket 46 is connected to the connecting link 30 by the axis 50 and the rear sensor bracket 60 is connected to the connecting link 30 by the axis 64. As a result, the forward force F3 and the backward force F5 are canceled through the connecting link 30. Thereby, the input which operates to the front sensor bracket 46 and the rear sensor bracket 60 through the axis 50 and the axis 64 becomes only the downward forces F2 and F4. Accordingly, the detection accuracy of the strain sensor 59 disposed on the front sensor bracket 46 and the strain sensor 70 disposed on the rear sensor bracket 60 does not decrease by the component force which operates backward and forward and the measurement accuracy of the load operated on the seat can be improved.

Figure 3:
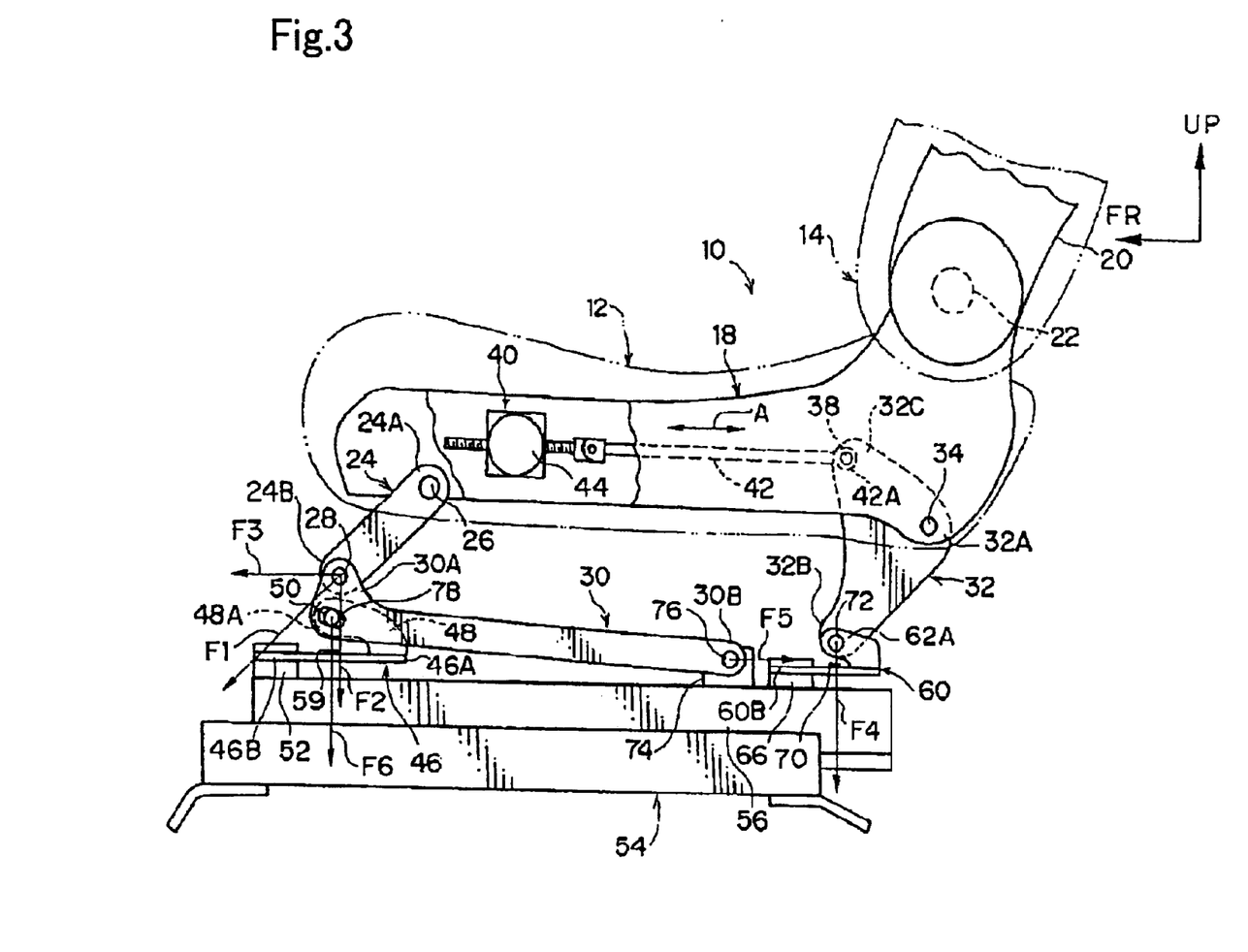
FIG. 3 is a general side view illustrating a part of a seat to which a seated passenger's weight detection device according to a second embodiment of the present invention is applied.

Next, a second embodiment of a seated passenger's weight detection device of the present invention will be described with referent to FIG. 3. With respect to the members which are the same as the first embodiment, the same reference numerals are applied thereto in FIG. 3 and the descriptions thereof are omitted. As shown in FIG. 3, in this embodiment, the lower end corner portion 32B of the rear link 32 is rotatably pivoted on the top end portion 62A of the mounting flange 62 by an axis 72 and the rear end portion 30B of the connecting link 30 is rotatably pivoted on a bracket 74 provided on the upper rail 56 of the seat rail 54 by an axis 76. Further, the axis 50 connecting between the front sensor bracket 46 and the connecting link 30 is disposed on a lower portion of the axis 28 and a hole 78 of the connecting link 30 which receives the axis 50 is formed as a long hole with consideration for the rotation of the connecting link 30.

Next, the operation of the second embodiment will be described. In the second embodiment, when a passenger is seated on the seat cushion 12 of the seat 10, load are applied to the strain sensor 59 on the front sensor bracket 46 and the strain sensor 70 on the rear sensor bracket 60 through the front link 24 and the rear link 32. In this time, the front link 24 and the rear link 32 have a predetermined inclined angle in response to the vertical position of the seat cushion 12. Thereby, a downward component force F2 and a forward component force F3 of an input F1 from the front link 24 operate to the axis 28 connecting between the front link 24 and the connecting link 30. Thereby, a reaction force F5 of the component force F3 operates to the axis 76 connecting between the connect link 30 and the bracket 74. Further, a downward input F4 from the rear link 32 operates to the axis 72 between the rear link 32 and the rear sensor bracket 60. Namely, although extra forward force F3 other than the downward force F2 being required for the strain sensor 59 is applied to the axis 28, the bracket 74 fixed to the upper rail 56 of the seat rail 54 and the axis 28 are connected each other by the connecting link 30 and the front sensor bracket 46 is connected to the connecting link 30 by the axis 78. As a result, the forward force F3 and the backward force F5 are canceled through the connecting link 30. Thereby, the input which operates to the front sensor bracket 46 through the axis 78 becomes only a downward component force F6. Further, the input which operate to the rear sensor bracket 60 through the axis 72 become only a downward component force F4. Accordingly, the detection accuracy of the strain sensor 59 disposed on the front sensor bracket 46 and the strain sensor 70 disposed on the rear sensor bracket 60 does not decrease by the component force which operates backward and forward and the measurement accuracy of the load operated on the seat can be improved.

Figure 4:
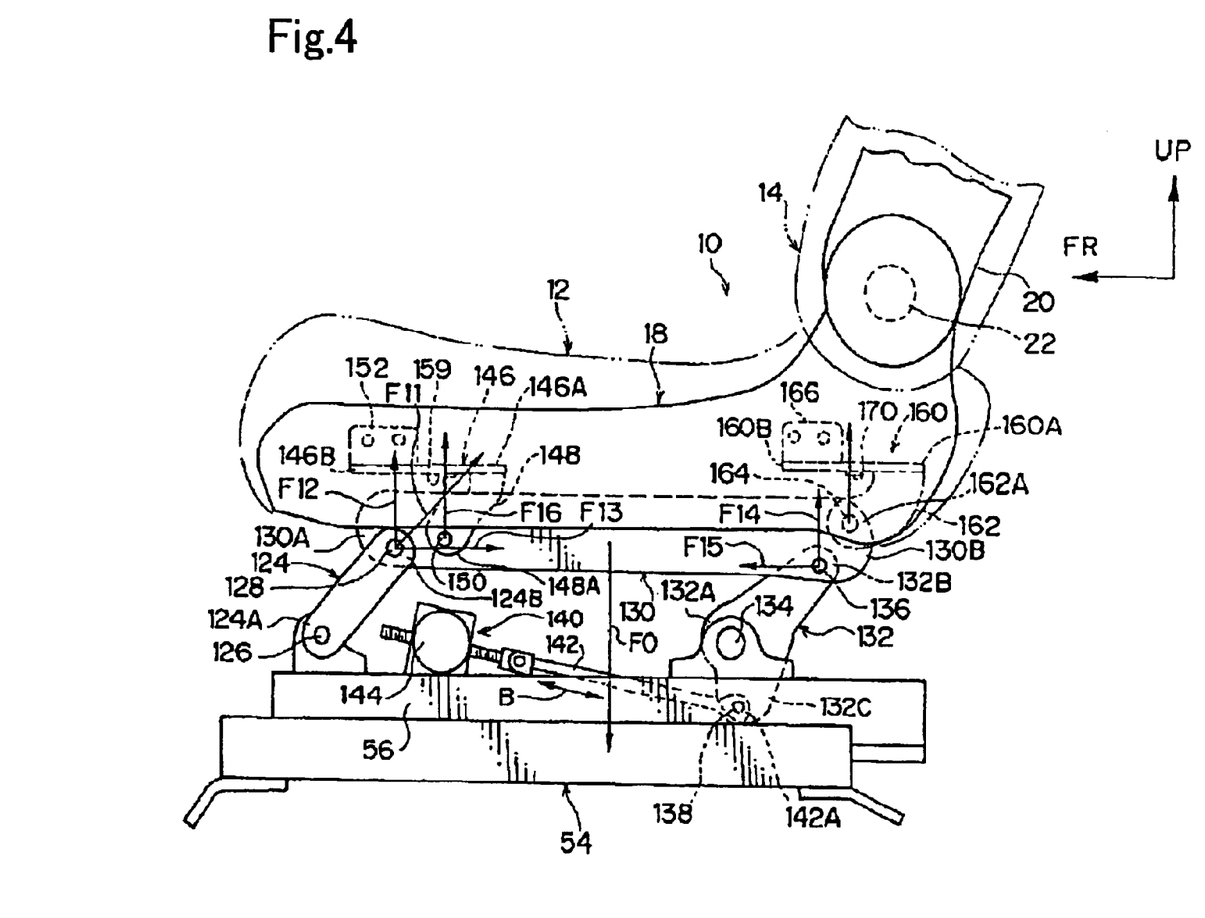
FIG. 4 is a general side view illustrating a part of a seat to which a seated passenger's weight detection device according to a third embodiment of the present invention is applied.

Next, a third embodiment of a seated passenger's weight detection device of the present invention will be described with referent to FIG. 4. With respect to the members which are the same as the first embodiment, the same reference numerals are applied thereto in FIG. 4 and the descriptions thereof are omitted. As shown in FIG. 4, on the vicinity of the front end portion of the upper rail 56 of the seat rail 54, a lower end portion 124A of a front link 124 constituting the seat vertical position adjusting means is rotatably connected thereon by an axis 126 and an upper end portion 124B of the front link 124 is rotatably connected to a front end portion 130A of a connecting link 130 corresponding to a connecting member as a backward and forward input cancel means.

On the other hand, on the vicinity of the rear end portion of the upper rail 56, a front end corner portion 132A of a rear link 132 having a triangle shape in side view constituting the seat vertical position adjusting means is rotatably connected thereon by an axis 134 and an upper end corner portion 132B of the rear link 132 is connected to a rear end portion 130B of the connecting link 130 by an axis 136. Further, an lower end corner portion 132C of the rear link 132 is rotatably connected to a rear end portion 142A of a rod 142 of an actuator 140 constituting the seat vertical position adjusting means by an axis 138. The actuator 140 is fixed to the upper rail 56 of the seat rail 54 and has a well known structure in which the rod 142 moves backward and forward by a rotation of a motor 144. Accordingly, when the rod 142 moves backward and forward (a direction shown by an arrow B in FIG. 4), the rear link 132 rotates around the axis 134 and the front link 124 rotates around the axis 126, and the connecting link 130 moves in the vertical direction.

The connecting link 130 is disposed approximately horizontally and a top end portion 148A of a mounting flange 148 provided on a rear end portion 146A of a front sensor bracket 146 is rotatably pivoted to the front end portion 130A of the connecting link 130 by an axis 150. Further, a front end portion 146B of the front sensor bracket 146 is fixed to the lower arm 18 through a bracket 152. A strain sensor 159 as a weight detecting sensor is disposed on a lower surface side of a center portion backward and forward of the front sensor bracket 146.

A top end portion 162A of a mounting flange 162 provided on a rear end portion 160A of a rear sensor bracket 160 is rotatably pivoted to the rear end portion 130B of the connecting link 130 by an axis 164 and the rear sensor bracket 160 has the almost same shape as the front sensor bracket 146. Further, a front end portion 160B of the rear sensor bracket 160 is fixed to the lower arm 18 through a bracket 166 and a strain sensor 170 as a weight detecting sensor is disposed on a lower surface side of a center portion backward and forward of the rear sensor bracket 160.

Next, the operation of the third embodiment will be described. In this embodiment, when a passenger is seated on the seat cushion 12 of the seat 10, load are applied to the strain sensor 159 on the front sensor bracket 146 and the strain sensor 170 on the rear sensor bracket 160 through the front link 124 and the rear link 132 as a reaction force of the load F0 operating to the connecting link 130. In this time, the front link 124 and the rear link 132 have a predetermined inclined angle in response to the vertical position of the seat cushion 12. Thereby, an upward component force F12 and a backward component force F13 of an input F11 from the front link 124 operate to the axis 128 connecting between the front link 124 and the connecting link 130. On the other hand, an upward input F14 from the rear link 132 and a reaction force F15 of the component force F13 operate to the axis 136 connecting between the connecting link 130 and the rear link 132 connected to the actuator 140. Namely, extra forward force F13 or extra backward force F15 other than the upward forces F12, F14 being required for the strain sensors 159, 170 is applied to the axis 128 and the axis 136.

In this embodiment, however, the axis 128 and the axis 136 are connected each other by the connecting link 130. The front sensor bracket 146 is connected to the connecting link 130 by the axis 150 and the rear sensor bracket 160 is connected to the connecting link 130 by the axis 164. As a result, the forward force F13 and the backward force F15 are canceled through the connecting link 130. Thereby, the input which operates to the front sensor bracket 146 and the rear sensor bracket 160 through the axis 150 and the axis 164 becomes only the upward forces F12 and F14. Accordingly, the detection accuracy of the strain sensor 159 disposed on the front sensor bracket 146 and the strain sensor 170 disposed on the rear sensor bracket 160 does not decrease by the component force which operates backward and forward and the measurement accuracy of the load operated on the seat can be improved.

Figure 5:
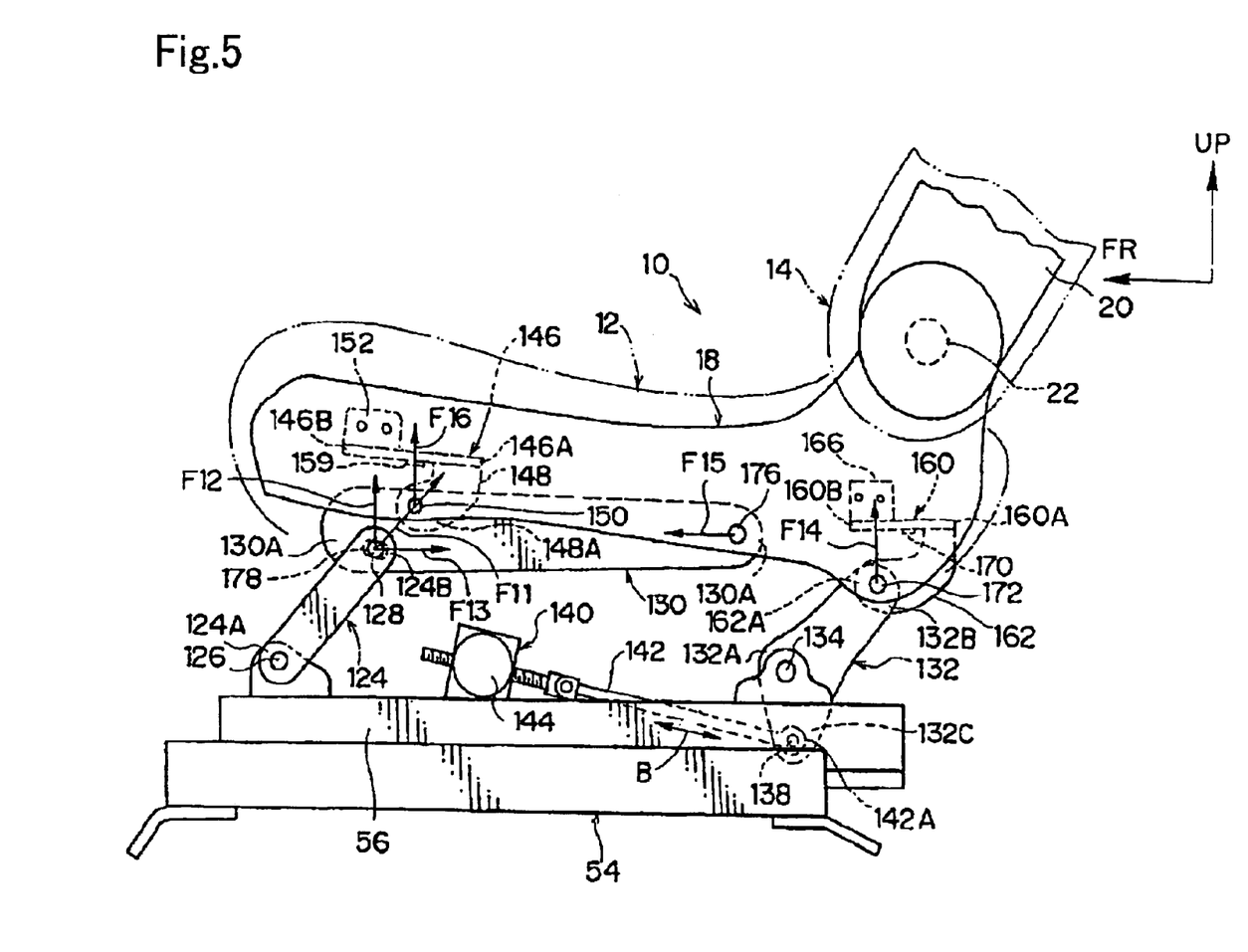
FIG. 5 is a general side view illustrating a part of a seat to which a seated passenger's weight detection device according to a fourth embodiment of the present invention is applied.

Next, a fourth embodiment of a seated passenger's weight detection device of the present invention will be described with referent to FIG. 5. With respect to the members which are the same as the third embodiment, the same reference numerals are applied thereto in FIG. 5 and the descriptions thereof are omitted. As shown in FIG. 5, in this embodiment, an upper end corner portion 132B of the rear link 132 is rotatably pivoted on the top end portion 162A of the mounting flange 162 of the rear sensor bracket 160 by an axis 172 and the rear end portion 130B of the connecting link 130 is rotatably pivoted on the lower arm 18 by an axis 176. Further, the axis 150 is disposed on an upper portion of the axis 128 and a hole 178 of the connecting link 130 which receives the axis 150 is formed as a long hole with consideration for the rotation of the connecting link 130.

Next, the operation of the fourth embodiment will be described. In the fourth embodiment, when a passenger is seated on the seat cushion 12 of the seat 10, load are applied to the strain sensor 159 on the front sensor bracket 146 and the strain sensor 170 on the rear sensor bracket 160 through the front link 124 and the rear link 132 as a reaction force of load operated to the lower arm 18 and the connecting link 130. In this time, the front link 124 and the rear link 132 have a predetermined inclined angle in response to the vertical position of the seat cushion 12. Thereby, an upward component force F12 and a backward component force F13 of an input F11 from the front link 124 operate to the axis 128 connecting between the front link 124 and the connecting link 130. Thereby, a reaction force F15 of the component force F13 operates to the axis 176 connecting between the connecting link 130 and the lower arm 18. Further, an upward input F14 from the rear link 132 operates to the axis 172. Namely, extra backward force F13 other than the upward force F12 being required for the strain sensor 159 is applied to the axis 128.

In this embodiment, however, the lower arm 18 and the axis 128 are connected each other by the connecting link 130 and the front sensor bracket 146 is connected to the connecting link 130 by the axis 150. As a result, the backward force F13 and the forward force F15 are canceled through the connecting link 130. Thereby, the input which operates to the front sensor bracket 146 through the axis 150 becomes only an upward component force F16. Further, the input which operates to the rear sensor bracket 160 through the axis 172 becomes only an upward component force F14. Accordingly, the detection accuracy of the strain sensor 159 disposed on the front sensor bracket 146 and the strain sensor 170 disposed on the rear sensor bracket 160 does not decrease by the component force which operates backward and forward and the measurement accuracy of the load operated on the seat can be improved.

In the above mentioned, the specific embodiments of the present invention are described in detail. However, the present invention is not limited to the specific embodiments and it is clear for skilled person that other different embodiments can adopt within the present invention. For example, in the above mentioned embodiments, the rod 42, 142 of the actuator 40, 140 constituting the seat vertical position adjusting means is connected to the rear link 32, 132. However, the rod 42, 142 of the actuator 40, 140 may be connected to the front link 24, 124.

As mentioned above, according to the present invention, the backward and forward component forces of the input operating to the weight detection sensor through the front link and the rear link of the seat vertical position adjusting means which are generated due to the inclination of the front link and the rear link are canceled by the backward and forward input cancel means. As a result, since the input operating to the weight detection sensor becomes only the component forces in the vertical direction, the detection accuracy of the weight detection sensor does not decrease by the component force which operates backward and forward and the measurement accuracy of the load operated on the seat can be improved.

What is claimed is:

1. A seat for a passenger car comprising:
   a member to be loaded by a passenger thereon;
   a sensor for detecting a passenger's weight on the member;
   a first link having one end portion rotatably connected to the member and having an opposite end portion, the first link being inclined downwardly;
   a second link having one end portion rotatably connected to the member and having an opposite end portion;
   an actuator which selectively allows and restricts rotatable motion of the second link relative to the member; and
   a third link rotatably connected to the opposite end portion of the first link and the opposite end portion of the second link, and connected to the sensor.

2. A seat for a passenger car according to claim 1, wherein the sensor comprises first and second strain gages that are connected to the third link by way of first and second flanges, respectively.

3. A seat for a passenger car according to claim 2, wherein the first and second strain gages are fixed to a seat rail.

4. A seat for a passenger car according to claim 2, wherein the third link includes an end portion that is inclined upwardly, the opposite end portion of the first link being connected to the upwardly inclined end portion of the third link.

5. A seat for a passenger car according to claim 4, wherein the first and second strain gages are fixed to a seat rail through respective brackets.

6. A seat for a passenger car according to claim 2, wherein the third link is connected to the second link via a seat rail.

7. A seat for a passenger car according to claim 1, wherein the sensor is fixed to a seat rail.

8. A seat for a passenger car according to one of claim 1, wherein the third link includes an end portion that is inclined upwardly, the opposite end portion of the first link being connected to the upwardly inclined end portion of the third link.

9. A seat for a passenger car according to claim 1, wherein the third link is connected to the second link via a seat rail.

10. A seat for a passenger car comprising:
    an upper member to be loaded by a passenger seated thereon;
    a lower member supporting the upper member;
    a sensor fixed to the upper member for detecting a passenger's weight on the upper member;
    a first link having one end portion rotatably connected to the lower member and having an opposite end portion, the first link being inclined upwardly;
    a second link having one end portion rotatably connected to the lower member and having an opposite end portion;
    an actuator for selectively allowing and restricting rotatable motion of the second link relative to the lower member; and
    a third link rotatably connected to the opposite end portions of the first and second links and connected to the sensor.

11. A seat for a passenger car according to claim 10, wherein the sensor comprises first and second strain gages, the third link being connected to the first and second strain gages through first and second flanges, respectively.

12. A seat for a passenger car according to claim 10, wherein the third link is connected to the second link via the upper member.

* * * * *